United States Patent
Sengupta

(10) Patent No.: US 12,120,230 B2
(45) Date of Patent: *Oct. 15, 2024

(54) METHOD AND SYSTEM FOR INTERACTING PUBLIC AND PRIVATE BLOCKCHAINS WITH CONTROLLED PARTICIPATION AND DISPUTE RESOLUTION

(71) Applicant: MASTERCARD INTERNATIONAL INCORPORATED, Purchase, NY (US)

(72) Inventor: Shuvam Sengupta, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 17/400,581

(22) Filed: Aug. 12, 2021

(65) Prior Publication Data

US 2021/0377023 A1 Dec. 2, 2021

Related U.S. Application Data

(62) Division of application No. 15/782,416, filed on Oct. 12, 2017, now Pat. No. 11,121,870.

(51) Int. Cl.
*G06Q 20/38* (2012.01)
*G06Q 10/06* (2023.01)
(Continued)

(52) U.S. Cl.
CPC .............. *H04L 9/30* (2013.01); *G06Q 10/06* (2013.01); *G06Q 10/103* (2013.01);
(Continued)

(58) Field of Classification Search
CPC ........ G06Q 20/00–425; H04L 9/00–50; H04L 2209/00–88
(Continued)

(56) References Cited

U.S. PATENT DOCUMENTS 6,405,181 B2 6/2002 Lent et al.
7,069,252 B2 * 6/2006 Ishimi ................. G06Q 10/087
705/28

(Continued)

OTHER PUBLICATIONS

Andreas M. Antonopoulos, Mastering Bitcoin, 2014, O'Reilly Media Inc., pertinent pp. 163, 164, 165, 169, 170 (Year: 2014).*

(Continued)

*Primary Examiner* — Chenyuh Kuo
(74) *Attorney, Agent, or Firm* — Panitch Schwarze Belisario & Nadel LLP

(57) ABSTRACT

A method for controlling participation in a blockchain based on time includes: storing participant profiles, each including a public key of a cryptographic key pair and a period of time; storing a blockchain comprised of a plurality of blocks; receiving a block submission from a specific computing system including a digital signature and a new data value; verifying the digital signature based on the public key stored in a specific participant profile related to the specific computing system; verifying that the specific computing system is eligible for participation in the blockchain based on the period of time included in the specific participant profile and a present time; generating a new block comprised of a block header and the new data value; and transmitting the generated new block to nodes associated with the blockchain. Private blockchains are generated for dispute resolution of things posted to the primary blockchain.

20 Claims, 6 Drawing Sheets

(51) Int. Cl.
  *G06Q 10/10* (2023.01)
  *G06Q 20/06* (2012.01)
  *G06Q 40/02* (2023.01)
  *G06Q 50/18* (2012.01)
  *H04L 9/30* (2006.01)
  *H04L 9/32* (2006.01)
  *H04L 9/00* (2022.01)

(52) U.S. Cl.
  CPC ....... *G06Q 20/065* (2013.01); *G06Q 20/3829* (2013.01); *G06Q 20/389* (2013.01); *G06Q 40/02* (2013.01); *G06Q 50/182* (2013.01); *H04L 9/3247* (2013.01); *G06Q 2220/00* (2013.01); *H04L 9/50* (2022.05); *H04L 2209/56* (2013.01)

(58) Field of Classification Search
  USPC ...................................................... 705/50–79
  See application file for complete search history.

(56) References Cited

U.S. PATENT DOCUMENTS

| | | | | |
|---|---|---|---|---|
| 10,355,869 | B2* | 7/2019 | Bisti | .............. H04L 9/0891 |
| 11,539,507 | B1* | 12/2022 | Vijayvergia | ............ H04L 9/088 |
| 2016/0260171 | A1 | 9/2016 | Ford et al. | |
| 2016/0330034 | A1 | 11/2016 | Back et al. | |
| 2017/0046806 | A1* | 2/2017 | Haldenby | ............. H04L 9/0861 |
| 2017/0048234 | A1* | 2/2017 | Lohe | ................... H04L 63/0807 |
| 2018/0254841 | A1* | 9/2018 | Nannra | ................. H04L 9/3236 |
| 2019/0253563 | A1 | 8/2019 | Ullah et al. | |
| 2022/0147987 | A1* | 5/2022 | Vijayaraghavan | ........................... H04L 63/0428 |
| 2023/0035321 | A1* | 2/2023 | Vijayaraghavan | ... G06Q 10/101 |

OTHER PUBLICATIONS

Andreas M. Antonopoulos, "Mastering Bitcoin—Unlocking Digital Cryptocurrencies", Dec. 20, 2014, pp. 1-298, O'Reilly Media, Beijing, Cambridge, Farnhan, Koln, Sebastopol, Tokyo.

Bashir, "Mastering Blockchain", Mar. 17, 2017, pp. 1-532, Pack! Publishing, Birmingham, UK.

Bitfury Group, "Public Versus Private Blockchains Part 2: Permissionless Blockchains", White Paper, Oct. 20, 2015, pp. 1-19, Bitfury Group, LLC.

Notification of Transmittal of the International Search Report and the Written Opinion of the International Searching Authority (Forms PCT/ISA/220, PCT/ISA/210 and PCT/ISA/237) issued on Dec. 7, 2018, by the European Patent Office in corresponding International Application No. PCT/US2018/048232. (13 pages).

Recommendation ITU-T X.509 Information technology—Open Systems Interconnection—The Directory: Public-key and attribute certificate frameworks (Oct. 2012) (Year: 2012).

Ron White, How Computers Work, QUE, Seventh Edition, 2003 (Year: 2003).

* cited by examiner

METHOD AND SYSTEM FOR INTERACTING PUBLIC AND PRIVATE BLOCKCHAINS WITH CONTROLLED PARTICIPATION AND DISPUTE RESOLUTION

FIELD

The present disclosure relates to the controlling of participation in a blockchain based on time, specifically the use of time-limited keys for contributing to a blockchain and the establishing of private blockchains from a public blockchain for use in verification and dispute processes of blockchain data.

BACKGROUND

When an individual submits data to an entity for use thereby, it is often up to the entity to verify the authenticity and accuracy of that data. For instance, if an individual applies for a credit card, they submit their financial information to the credit card company, who must then verify that data, check the individual's credit history, and identify if there may be any problems with issuing the individual a credit card. This may be a time consuming and laborious process for the credit card company. In addition, entities that may have relevant data may want to contribute, but may be unaware of the application by the individual unless specifically contacted by the individual and/or credit card company. Thus, there is a need for providing a publicly available process for the submission of data and verification thereof.

Blockchains provide for a suitable storage mechanism where data may be publicly available while still retaining immutability from tampering. A blockchain can serve as a public, immutable record of proceedings that may provide all entities with notice of a data submission and provide an opportunity to participate. However, data cannot be removed from a blockchain, which may cause confusion in the case of disputes of submitted data if the record gets significantly muddled or disputed. In addition, entities may be interested in limiting the ability to participate in the validation or dispute of a submission. However, there is currently no such capability in any blockchain system. Thus, there is a need for a technical solution to provide for controlled participation in a blockchain, while also enabling an opportunity for entities to verify or dispute data without complicating the record.

SUMMARY

The present disclosure provides a description of systems and methods for the controlling of participation in a blockchain based on time. When a new submission is made to a blockchain by an individual, outside entities may be able to submit additional data to compliment the submission, validate the submission, dispute the submission, etc. To provide for a measure of control of the participation, while maintaining the open and public nature of a blockchain, a system of timestamps associated with cryptographic keys may be used to control the ability to submit data into new blocks in the blockchain. In addition, in cases of dispute, separate blockchains may be created to manage the dispute to provide for an immutable record of the dispute where the resolution can be stored in the primary blockchain to provide a clear, and yet still clean, record.

A method for controlling participation in a blockchain based on time includes: storing, in a participant database of a processing server, a plurality of participant profiles, wherein each participant profile is a structured data set related to a computing system and includes at least a public key of a cryptographic key pair associated with the related computing system and a period of time; storing, in a memory of the processing server, a blockchain comprised of a plurality of blocks, wherein each block includes at least a block header and one or more data values; receiving, by a receiving device of the processing server, a block submission from a specific computing system, wherein the block submission includes at least a digital signature and a new data value; verifying, by a verification module of the processing server, the digital signature based on at least the public key stored in a specific participant profile related to the specific computing system; verifying, by the verification module of the processing server, that the specific computing system is eligible for participation in the blockchain based on at least the period of time included in the specific participant profile and a present time of the processing server; generating, by a generation module of the processing server, a new block comprised of a block header and at least one data value, wherein the at least one data value includes the new data value; and electronically transmitting, by a transmitting device of the processing server, the generated new block to one or more nodes associated with the blockchain.

A system for controlling participation in a blockchain based on time includes: a participant database of a processing server configured to store a plurality of participant profiles, wherein each participant profile is a structured data set related to a computing system and includes at least a public key of a cryptographic key pair associated with the related computing system and a period of time; a memory of the processing server configured to store a blockchain comprised of a plurality of blocks, wherein each block includes at least a block header and one or more data values; a receiving device of the processing server configured to receive a block submission from a specific computing system, wherein the block submission includes at least a digital signature and a new data value; a verification module of the processing server configured to verify the digital signature based on at least the public key stored in a specific participant profile related to the specific computing system, and verify that the specific computing system is eligible for participation in the blockchain based on at least the period of time included in the specific participant profile and a present time of the processing server; a generation module of the processing server configured to generate a new block comprised of a block header and at least one data value, wherein the at least one data value includes the new data value; and a transmitting device of the processing server configured to electronically transmit the generated new block to one or more nodes associated with the blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Controlled Participation in a Blockchain

Figure 1:
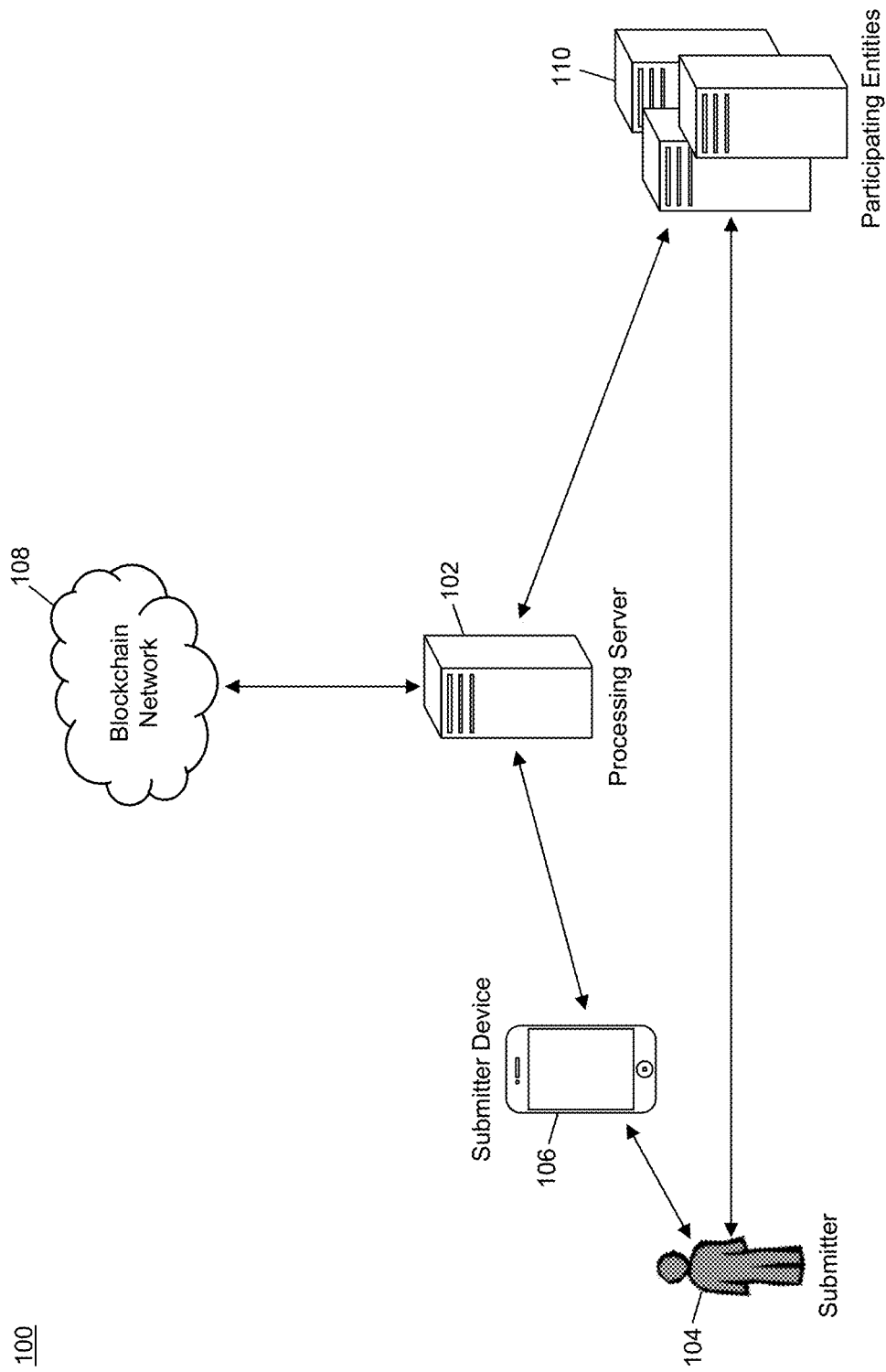
FIG. 1 is a block diagram illustrating a high level system architecture for the controlling of participation in a blockchain based on time in accordance with exemplary embodiments.

FIG. 1 illustrates a system 100 for the control of participation in a blockchain based on time and the creation of additional blockchains for verification or dispute processes.

The system 100 may include a processing server 102. The processing server 102, discussed in more detail below, may be configured to control the participation in a blockchain, specifically the ability to add new data to a blockchain following an original data submission, based on time. In the system 100, a submitter 104 may submit data for inclusion in a blockchain via a submitter device 106. The submitter device 106 may be any type of computing device suitable for performing the functions discussed herein, such as a desktop computer, laptop computer, notebook computer, tablet computer, cellular phone, smart phone, smart watch, smart television, wearable computing device, etc. The submitter 104 may submit the data for inclusion on a blockchain associated with a blockchain network 108. The blockchain network 108 may be comprised of a plurality of nodes, where the nodes are configured to generate and validate new blocks for addition to the blockchain. In exemplary embodiments, each node in the blockchain network 108 may maintain an accurate and up-to-date copy of the blockchain using suitable methods.

In some embodiments, the processing server 102 may be a node in the blockchain network 108. In other embodiments, the processing server 102 may not operate as a node in the blockchain network 108, but may be in communicate with one or more nodes for the submission of data thereto for inclusion in the blockchain. The blockchain associated with the blockchain network 108 may include a plurality of blocks. Each block may include a block header and one or more data values. Each block header may include at least a timestamp, a block reference value, and a data reference value. The timestamp may be a time when the respective block was generated, and may be represented using any suitable format (e.g., UNIX timestamp, DateTime, etc.). The block reference value may be a reference to the preceding block in the blockchain, where the preceding block may be the block most recently added to the blockchain prior to addition of that respective block, such as may be identified via timestamp. The data reference value may be a reference to the one or more data values included in the respective block. In an exemplary embodiment, the block reference values and data reference values may be hash values generated via the application of one or more hashing algorithms to the respective data. For instance, a block reference value may be a value resulting from a hashing of the block header of the preceding block, and the data reference value may be the root of a Merkle tree of the one or more data values included in the respective block.

The use of reference values may ensure immutability and accuracy of the blockchain. Because each block header has a data reference value that is unique to an exact set of data values, no data value may be adjusted or tampered with without all nodes in the blockchain network 108 being aware as it would require modification to that block header's data reference value. As each header also includes a block reference value that is unique to an exact block header for an earlier block (which has its own unique data reference value), any change to a data reference value would also require modification of the block reference value of the next block added to the blockchain, as well as every subsequent block. Thus, with each block that is added, the ability to tamper with any data values becomes more and more impossible due to limitations of computing power, processing speed, and network communication times, particularly as the reference values would have to be updated in every single node in the blockchain network 108 prior to the addition of a new block.

In the system 100, the submitter 104 may submit data to the processing server 102 via the submitter device 106. The data may be submitted using any suitable method, such as via a specifically-configured application program, a web page, an application programming interface, a direct file transfer, etc. The submitter device 106 and processing server 102 may communicate using any suitable communication method, such as a local area network, cellular communication network, the Internet, etc. The submitter 104 may provide a new data value to the processing server 102 that is to be added to the blockchain associated with the blockchain network 108. The processing server 102 may provide this data value to a node in the blockchain network 108, which may include the data value in the next block that is generated, validated, and added to the blockchain. In embodiments where the processing server 102 may be a node, the processing server 102 may generate a new block including the new data value in that block's one or more data values, which may be distributed to other nodes in the blockchain network 108 for validation prior to addition to the blockchain.

Once the data submission has been made, one or more participating entities 110 may be able to participate in the blockchain, such as by verifying, validating, disputing, or otherwise performing one or more actions based on the submitted data. For example, the submitter 104 may be an individual applying for a new credit card. The new data value may be comprised of information associated with the submitter 104, such as their credit card application, which may include, for instance, name, address, tax identification number, etc. In such an example, the participating entities 110 may include credit bureaus, financial institutions (e.g., banks where the submitter 104 has an account), merchants, taxation agencies, etc. These participating entities 110 may be interested in submitting data to the blockchain to accompany the credit card application, such as credit scores, account statements, payment histories, etc.

The processing server 102 may be configured to control the participation in the blockchain for each of the participating entities 110 based on time. Each participating entity 110 may have a profile registered with the processing server 102, referred to herein as a participant profile, discussed in more detail below. Each participant profile may include at least a period of time during which the related participating entity 110 is eligible to submit data, as well as a public key that is part of a cryptographic key pair associated with the related participating entity 110. A participating entity 110 may submit data for inclusion in the blockchain to the processing server 102 using a suitable communication network and method. Prior to the transmission, the participating entity 110 may digitally sign the submission using the private key of their cryptographic key pair.

The processing server 102 may receive the signed submission and may validate the submission to identify if the participating entity 110 is eligible to participate. The processing server 102 may validate the digital signature on the signed submission using the public key included in the participating entity's participant profile. The processing server 102 may also take a timestamp of the present time of the processing server 102 when the submission is received, and validate that the present time is within the period of time in the participating entity's participant profile. If the digital signature is not validated, or if the submission is made outside of the participating entity's registered period of time, the submission may be invalid. If the submission is valid, the processing server 102 may proceed to add the submission to the blockchain, such as using the process outlined above.

In some embodiments, the submission made by the submitter 104 to which the participating entities 110 are participating (herein referred to as the "primary submission") made be associated with an identifier unique to the submission. For instance, when the processing server 102 receives a new submission from a submitter 104, the processing server 102 may generate or otherwise identify a unique identification value to refer to the submission, such as an identification number, which may be included in the data value stored in the blockchain. Submissions made by the participating entities 110 (herein referred to as "participating submissions") may include the unique identification value, which may be further included when, if validated, the submission is added to the blockchain. In such embodiments, the identification value may be used to keep track of all submissions that are associated with one primary submission, such as in instances where the blockchain may include a plurality of submissions being made by multiple submitters 104 or multiple submissions by a single submitter 104.

In some embodiments, the processing server 102 may also control participation by submitters 104. In such embodiments, each submitter 104 may also have a participant profile in the processing server 102, which may include at least a public key of a cryptographic key pair associated with the submitter 104. The submitter 104 may digitally sign any submission made to the processing server 102 using the private key of their cryptographic key pair, where the processing server 102 may validate the signature using the public key prior to including the new data value in a new block added to the blockchain. In some such embodiments, a submitter's participant profile may also include a period of time, which may set a time period during which the submitter 104 is allowed to make submissions. For instance, in the above example, the submitter 104 may want to submit an application for a new credit card and may start the process with the appropriate financial institution. This may start the period of time during which the submitter 104 is eligible to submit all of their required documentation and information to the blockchain, which may in turn start periods of time for participation by the participating entities 110.

In some embodiments, the processing server 102 may be configured to facilitate dispute or verification processes regarding participant submissions. For instance, a participating entity 110 may make a participating submission that intends to verify or dispute the authenticity of a piece of information in the primary submission. For instance, the submitter 104 may submit employment history as part of their primary submission, and the participating entity 110 may be their employer seeking to verify their stated employment. In another example, a participating entity 110 may dispute the participating submission made by another participating entity 110 and may make a participant submission to that effect. When further submissions are required to settle a dispute or validate a verification, the processing server 102 may be configured to initiate the creation of a second blockchain, either directly (e.g., as a node of the blockchain network 108) or by instructing a node of the blockchain network 108. The second blockchain may be created, where the genesis block (e.g., the very first block created for that blockchain) may include the participating submission that initiated the creation as the data value stored therein. Any new submissions directed to resolving the dispute may be made to the second blockchain rather than the primary blockchain, in order to simplify the record made for the primary submission. The participating submissions may be made to the second blockchain using the processes discussed above, where each participating entity 110 may be validated and must make their submissions within a period of time. In some cases, the period of time for submission to the second blockchain may be different from the period of time for submission to the primary blockchain, and may also be shorter and within the period of time for submission to the primary blockchain.

In some embodiments, the second blockchain may be a private blockchain. In such embodiments, the data included in the second blockchain may only be made available to authorized entities, which may be determined by the submitter 104, the entity associated with the primary submission (e.g., the credit card company in the above example), the participating entity 110 that made the submission that initiated creation of the second blockchain, or other suitable entity. In addition, the processing server 102 may be configured to generate cryptographic key pairs for any participating entity 110 that is eligible to provide submissions to the second blockchain. The processing server 102 may provision the private key for each key pair to the appropriate participating entity 110, which may then use the private key to sign submissions being made to the second blockchain. Submissions may be made to the second blockchain until a resolution has been achieved (e.g., as determined by the participants, the entity associated with the primary submission, the submitter 104, or other suitable entity) or until a period of time set for participation has expired. Once a resolution is achieved or time expired, a new submission may be made to the primary blockchain associated with the second blockchain that includes a data value indicating the result of the second blockchain (e.g., the resolution or lack thereof). In some instances, the second blockchain may be discarded or deleted following its completion. In other instances, the second blockchain may be retained, with a reference thereto included in the associated data value, such as for accessing the second blockchain as a record. The use of second blockchains for various participating submissions may provide participating entities 110 with a method to contribute to a primary submission or related participating submissions without obscuring the record for the primary submission, but while still retaining the immutability and benefits of the blockchain.

The methods and systems discussed herein provide for control over participation in a blockchain based on time, as well as the ability to facilitate additional blockchains for dispute resolution of submissions to a primary blockchain. The control of participation may ensure that entities are provided with an opportunity to participate in a submission to the blockchain, while also limiting the scope of such participation to ensure that matters can be accurately settled in a timely fashion. The use of keys in addition to timestamps can also ensure that, not only do participating entities 110 act in a timely fashion, but that all participating entities 110 that participate are authorized and that submissions are made by entities that have been properly authenticated. As a result, submissions can be vetted, authenticated, and verified through a publicly accountable process that can be independently audited and confirmed, while still providing for enough control as to ensure timeliness and efficiency in participation.

Processing Server

Figure 2:
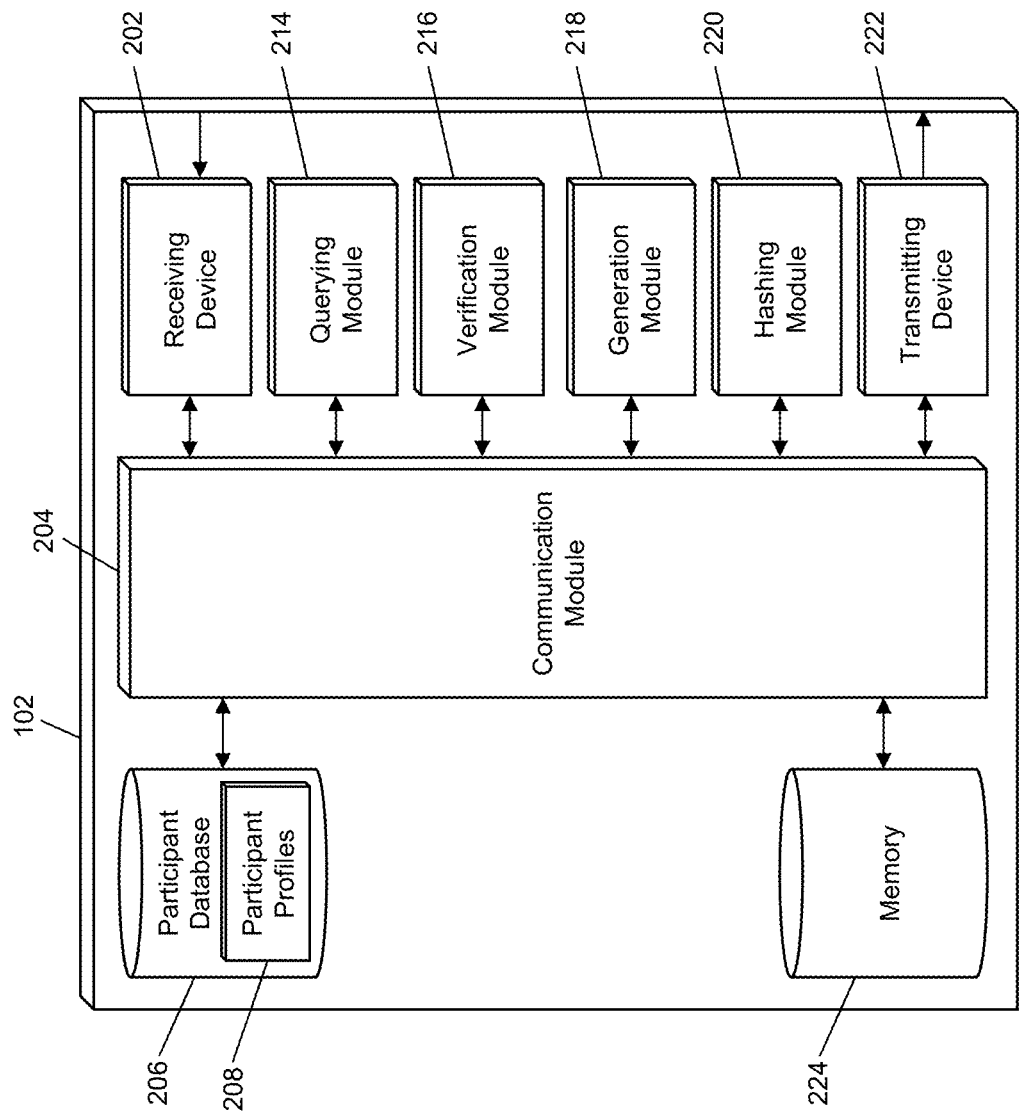
FIG. 2 is a block diagram illustrating the processing server of the system of FIG. 1 for the controlling of participation in a blockchain based on time in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from submitter devices 106, blockchain networks 108, blockchain nodes, participating entities 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by submitter devices 106 and participating entities 110 that may be superimposed or otherwise encoded with data values for inclusion in a blockchain (e.g., the primary blockchain or second blockchain, as applicable). The data values may also be accompanied by unique identification values, as applicable, and may also be digitally signed by private keys associated with the submitting entity (e.g., the submitter 104 or participating entity 110). The receiving device 202 may also be configured to receive data signals electronically transmitted by nodes in the blockchain network 108, such as may be superimposed or otherwise encoded with blockchain data, such as new blocks for verification, block verifications, updated blockchains, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, verification module 216, generation module 218, hashing module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

In some embodiments, the processing server 102 may include an participant database 206. The participant database 206 may be configured to store a plurality of participant profiles 208 using a suitable data storage format and schema. The participant database 206 may be a relational database that utilizes structured query language for the storage, identification, modifying, updating, accessing, etc. of structured data sets stored therein. Each participant profile 208 may be a structured data set configured to store data related to a participating entity 110, which, in some embodiments, may include submitters 104. Each participant profile 208 may be configured to store at least a public key of a cryptographic key pair associated with the related participating entity 110 and a period of time during which the related participating entity 110 is eligible to submit data values to the blockchain. In cases where one or more second blockchains may have been initiated, a participant profile 208 may include a public key and period of time for submissions to each second blockchain the related participating entity 110 may be able to participate in. In some embodiments, a participant profile 208 may include an identification value unique to the participant profile 208, such as an identification number, e-mail address, telephone number, username, etc. In some cases, the public key may be suitable for use as an identification value.

The processing server 102 may include a querying module 214. The querying module 214 may be configured to execute queries on databases to identify information. The querying module 214 may receive one or more data values or query strings, and may execute a query string based thereon on an indicated database, such as the memory 224, to identify information stored therein. The querying module 214 may then output the identified information to an appropriate engine or module of the processing server 102 as necessary. The querying module 214 may, for example, execute a query on the participant database 206 to identify a participant profile 208 stored therein related to a data submission received by the receiving device 202 of the processing server 102, such as based on an identification value.

The processing server 102 may also include a verification module 216. The verification module 216 may be configured to perform verifications for the processing server 102 for performing the functions of the processing server 102 as discussed herein. The verification module 216 may receive an instruction requesting that data be verified, may attempt to verify the data, and may output a result of the verification to another module or engine of the processing server 102. In some embodiments, the input may be accompanied by the data to be verified and/or used in the verification. In other embodiments, the verification module 216 may be configured to identify the data based on the instructions (e.g., by instructing the querying module 214 to execute a query to identify the data). The verification module 216 may be configured to, for instance, verify a digital signature of a data submission received by the receiving device 202 using a public key of a cryptographic key pair that includes the private key used to generate the digital signature. The verification module 216 may also be configured to verify eligibility of a data submission based on time, by checking to see if a present time of the processing server 102 is within the period of time included in a participant profile 208 related to the participating entity 110 that made the submission. In embodiments where the processing server 102 may be a node in the blockchain network 108, the verification module 216 may be further configured to verify blocks using suitable methods that will be apparent to persons having skill in the relevant art.

The processing server 102 may also include a generation module 218. The generation module 218 may be configured to generate data for use by the processing server 102 in performing the functions discussed herein. The generation module 218 may receive an instruction, may generate data based on that instruction, and may output the generated data to another module or engine of the processing server 102. In embodiments where the processing server 102 may be a node in the blockchain network 108, the generation module 218 may be configured to generate new block headers and new blocks for inclusion in the blockchain. In embodiments where second blockchains may be used, the generation module 218 may be configured to generate cryptographic key pairs for provisioning of private keys to participating entities 110. In some cases, the generation module 218 may also be configured to generate unique identification values for new submissions received from submitter devices 106.

The processing server 102 may also include a hashing module 220. The hashing module 220 may be configured to generate hash values by hashing data using suitable hashing algorithms for performing the functions of the processing server 102 as discussed herein. The hashing module 220 may receive data to hash as input, may apply one or more hashing algorithms to the data to generate a hash value, and may output the hash value to another module or engine of the processing server 102. For example, in embodiments where the processing server 102 may be a node in the blockchain network 108, the hashing module 220 may be configured to generate data reference values via application of one or more hashing algorithms to the data values being added to a new block, and may also be configured to generate block reference values via hashing of a block header of a preceding block in the blockchain.

The processing server 102 may also include a transmitting device 222. The transmitting device 222 may be configured to transmit data over one or more networks via one or more network protocols. In some instances, the transmitting device 222 may be configured to transmit data to submitter devices 106, blockchain networks 108 and nodes in the blockchain networks 108, participating entities 110, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to submitter devices 106 and/or participating entities 110 that are superimposed or otherwise encoded with information regarding data submissions, such as confirmations that a submission has been added to the blockchain or submitted for addition to the blockchain. The transmitting device 222 may also be configured to electronically transmit data signals superimposed or otherwise encoded with unique identification values for data submissions, private keys of cryptographic key pairs, periods of time for eligibility for making data submissions, and other data to submitter devices 106 and/or participating entities 110 for use in performing the functions discussed herein. The transmitting device 222 may also be configured to electronically transmit data signals that are superimposed or otherwise encoded with data values to a node in the blockchain network 108 for inclusion in a new block or for the initiation of a second blockchain. In embodiments where the processing server 102 may be a node in the blockchain network 108, the transmitting device 222 may electronically transmit data signals to other nodes in the blockchain network 108 that are superimposed or otherwise encoded with generated blocks for verification and addition to the blockchain.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein. The memory 224 may be configured to store, for example, hashing algorithms, time period rules, completed second blockchains, key generation algorithms, etc.

Process for Controlled Participation in a Blockchain

Figure 3:
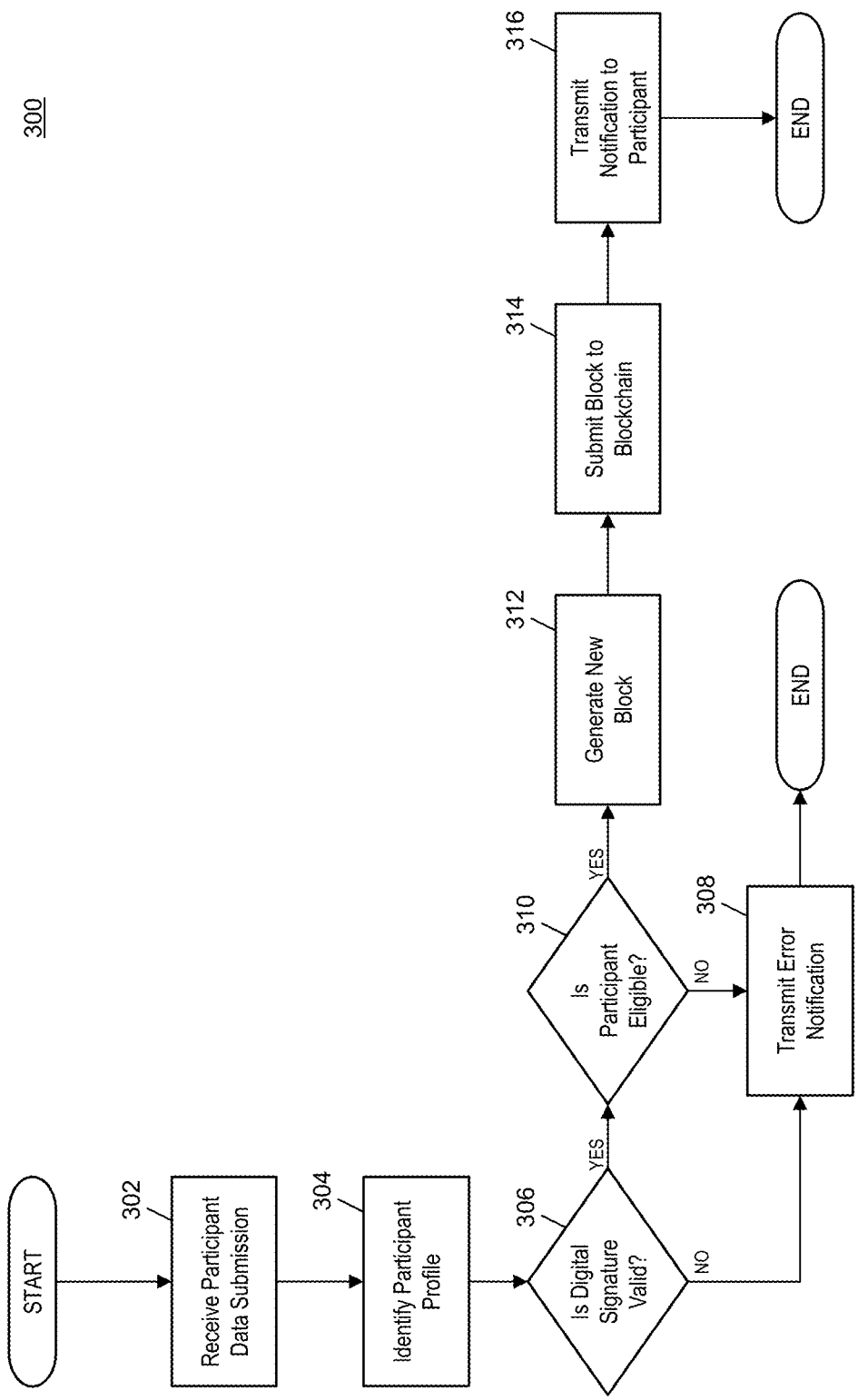
FIG. 3 is a flow diagram illustrating a process for adding new data to a blockchain using controlling participation using the processing server of FIG. 2 in accordance with exemplary embodiments.

FIG. 3 illustrates a process 300 executed by the processing server 102 of the system 100 of FIG. 1 for the controlling of participation in a blockchain, specifically the checking of eligibility for a new data submission made to a blockchain by a submitter 104 or participating entity 110.

In step 302, the receiving device 202 of the processing server 102 may receive a data submission from a submitter 104 or participating entity 110 using a suitable communication network and method. The data submission may include at least a new data value and a digital signature. In some cases, the data submission may include a unique identification value associated with a primary submission to which it relates. In some instances, the data submission may include a public key associated with the private key used to generate the digital signature or other identifying information associated with the submitter 104 or participating entity 110. In some 304, the querying module 214 of the processing server 102 may execute a query on the participant database 206 to identify a participating profile 208 related to the submitter of the data submission, such as using the identifying information included in the data submission.

In step 306, the verification module 216 of the processing server 102 may determine if the digital signature is valid. The determination may be based on an attempted verification of the digital signature using the public key stored in the identified participant profile 208. Methods for verifying a digital signature using a public key will be apparent to persons having skill in the relevant art. If the verification is unsuccessful (e.g., the digital signature is invalid), then, in step 306, the transmitting device 222 of the processing server 102 may electronically transmit an error notification back to the data's submitter (e.g., the submitter device 106 or participating entity 110) that indicates that the signature was invalid. The process 300 may then be completed. In some cases, the submitter may be provided with additional opportunities to submit the data.

If the signature is valid, then, in step 310, the verification module 216 of the processing server 102 may determine if the submitter 104 or participating entity 110 is eligible to make new data submissions to the blockchain (e.g., or second blockchain, as applicable). The determination may be based on a check to see if the present time of the processing server 102 is within the period of time during which the submitting entity is eligible, based on the period of time stored in the identified participating profile 208. If the submitter is not eligible (e.g., the present time is outside of the associated period of time), then the process 300 may proceed to step 308 where an error notification may be electronically transmitted thereto, indicating the ineligibility.

If the submission is eligible, then, in step 312, the generation module 218 of the processing server 102 may generate a new block for addition to the blockchain, where the one or more data values included in the block includes the new data value included in the data submission. In some cases, the generation module 218 may wait until a predetermined period of time has expired (e.g., every 10 minutes) or a predetermined number of data values have been received before generating a new block, such as to optimize processing efficiency and balance the number of new blocks added to the blockchain. The new block may include the one or more data values and a block header generated by the generation module 218 that includes the present time of the processing server 102 as a timestamp, a data reference value (e.g., a hash of the one or more values), and a block reference value (e.g., a hash of the block header of the preceding block in the blockchain). In some embodiments, the generation module 218 may generate a unique identification value for the submission (e.g., if the submission is a primary submission or may initiate a second blockchain) that may be included in the new data value.

In step 314, the transmitting device 222 of the processing server 102 may electronically transmit the newly generated block to one or more nodes in the blockchain network 108. The nodes may proceed to validate the new block using methods that will be apparent to persons having skill in the relevant art. Once the new block is validated, it may be added to the blockchain and distributed to all of the nodes in the blockchain network 108. In step 316, the transmitting device 222 of the processing server 102 may electronically transmit a notification to the submitter of the data submission (e.g., the submitter 104 via the submitter device 106 or a participating entity 110). The notification may include a confirmation of the addition of the new data value to the blockchain and may also include the unique identification value assigned to the new data value, as applicable.

Process for Initiation of a Second Blockchain for Data Submissions

Figure 4:
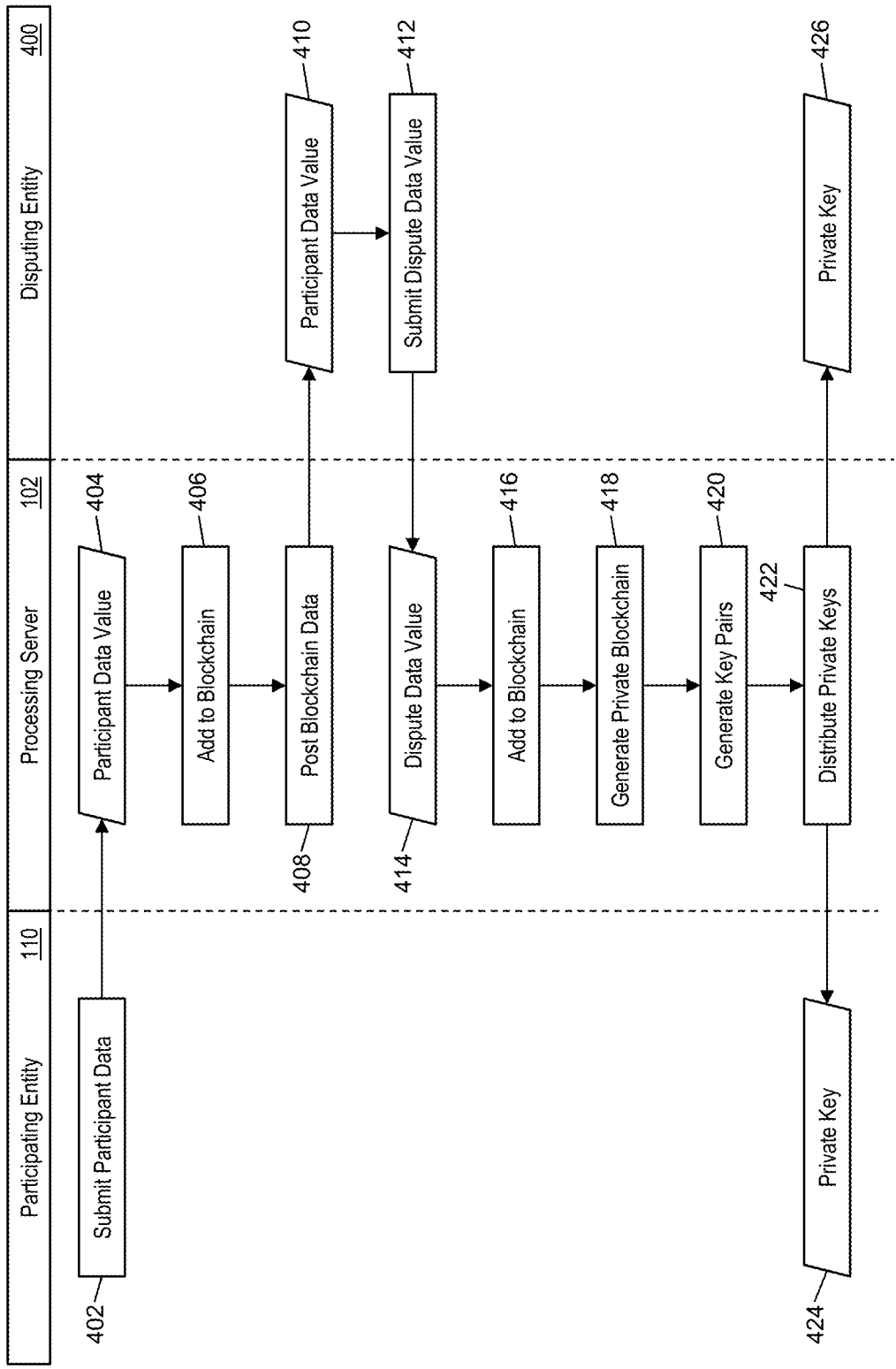
FIG. 4 is a flow diagram illustrating a process for the initiation of a dispute or verification process separate from a primary blockchain in the system of FIG. 1 in accordance with exemplary embodiments.

FIG. 4 illustrates a process for the initiation of a second blockchain with limited participation for use in the system 100 for dispute resolution regarding data submissions made to the primary blockchain.

In step 402, a participating entity 110 may make a data submission to the processing server 102, such as described with respect to the process 300 discussed above. In step 404, the receiving device 202 of the processing server 102 may receive the data submission, which may include a new data value, digital signature, and a unique identification value associated with a primary data value to which the new data value relates. In step 406, the processing server 102 may have the new data value added to the blockchain using the methods discussed herein. In step 408, the newest block added to the blockchain that includes the new data value may be made publicly available for accessibility by any interested entity, including a disputing entity 400 that may wish to dispute the new data value or data included therein. In step 410, the disputing entity 400 may retrieve the new data value submitted by the participating entity 110 from the blockchain.

In step 412, the disputing entity 400 may submit a new data submission to the processing server 102 that includes a dispute data value, which may be disputing the new data value that was submitted by the participating entity 110, as well as a digital signature generated by the disputing entity 400 using a private key associated therewith. In step 414, the receiving device 202 of the processing server 102 may receive this data submission. In step 416, the new data submission may be validated and the dispute data value added to the blockchain, such as discussed in the process 300 above.

In step 418, a private blockchain may be generated. In embodiments where the processing server 102 may not be a node in the blockchain network 108, step 418 may include the electronic transmission of the participating data value and dispute data value to a node in the blockchain network with a request for creation of a private blockchain. In embodiments where the processing server 102 is a node in the blockchain network 108, step 418 may include the generation, by the generation module 218 of the processing server, of the new private blockchain with the participating data value and dispute data value being included in the genesis block. In step 420, the generation module 218 of the processing server 102 (or a node in the blockchain network 108, as applicable), may generate a plurality of cryptographic key pairs, where each key pair includes at private key and corresponding public key. A key pair may be generated for each entity that may be allowed to participate in the private blockchain, including at least the participating entity 110 and disputing entity 400, and may include additional entities as may be identified by the participating entity 110 or disputing entity 400 (e.g., when making the data submissions or following the process illustrated in FIG. 4).

In step 422, the transmitting device 222 of the processing server 102 may electronically transmit the private key included in each generated key pair to one of the entities allowed to participate in the private blockchain, including the participating entity 110 and disputing entity 400. In some embodiments, the querying module 214 may execute a query on the participant database 206 for each key distribution to store, in a participant profile 208 related to the entity receiving the private key, the corresponding public key and a period of time in which the entity is eligible to respond. In step 424, the participating entity 110 may receiving their private key, which may be used to generate digital signatures for submissions made to the private blockchain. In step 426, the disputing entity 400 may receive their private key. Each entity may then be eligible to make submissions to the private blockchain during the period of time. Submissions may continue to be submitted and added to the blockchain until the dispute is resolved. At such a time, the processing server 102 may add a new data value to the blockchain indicating the resolution of the dispute, which may be submitted by the submitter 104, participating entity 110, disputing entity 400, or generated directly by the processing server 102.

Exemplary Method for Controlling Participation in a Blockchain

Figure 5:
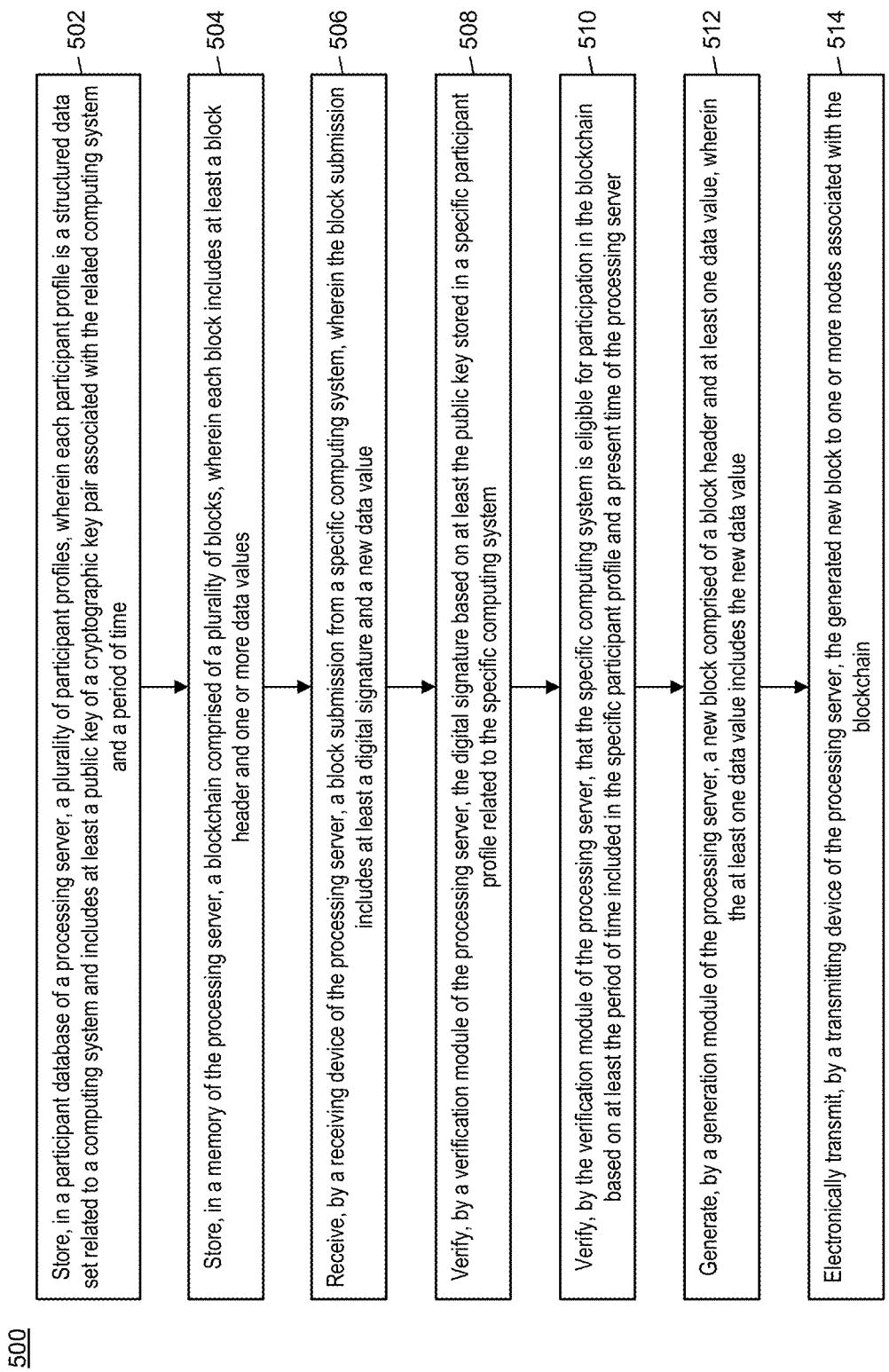
FIG. 5 is a flow chart illustrating an exemplary method for controlling participation in a blockchain based on time in accordance with exemplary embodiments.

FIG. 5 illustrates a method 500 for the controlling of participation in a blockchain based on time, where a private key used to generate a digital signature for authenticating submissions may only be valid during a predetermined period of time.

In step 502, a plurality of participant profiles (e.g., participant profiles 208) may be stored in a participant database (e.g., the participant database 206) of a processing server (e.g., the processing server 102), wherein each participant profile is a structured data set related to a computing system (e.g., participating entity 110) and includes at least a public key of a cryptographic key pair associated with the related computing system and a period of time. In step 504, a blockchain comprised of a plurality of blocks may be stored in a memory (e.g., the memory 224) of the processing server, wherein each block includes at least a block header and one or more data values. In step 506, a block submission may be received by a receiving device (e.g., the receiving device 202) of the processing server from a specific computing system, wherein the block submission includes at least a digital signature and a new data value.

In step 508, the digital signature may be verified by a verification module (e.g., the verification module 216) of the processing server based on at least the public key stored in a specific participant profile related to the specific computing system. In step 510, the verification module of the processing server may verify that the specific computing system is eligible for participation in the blockchain based on at least the period of time included in the specific participant profile and a present time of the processing server. In step 512, a new block comprised of a block header and at least one data value may be generated by a generation module (e.g., the generation module 218) of the processing server, wherein the at least one data value includes the new data value. In step 514, the generated new block may be electronically transmitted by a transmitting device (e.g., the transmitting device 222) of the processing server to one or more nodes associated with the blockchain.

In one embodiment, generating the new block may include: generating, by a hashing module (e.g., the hashing module 220) of the processing server, a data reference value via application of one or more hashing algorithms to the at least one data value; and generating, by the hashing module of the processing server, a block reference value via application of one or more hashing algorithms to a most recent block of the plurality of blocks, wherein the block header included in the new block includes at least the generated data reference value and the generated block reference value. In some embodiments, the block header included in each block of the plurality of blocks may include a timestamp, and the block header included in the new block may include the present time of the processing server. In one embodiment, the present time may be included within the period of time included in the specific participant profile. In some embodiments, the period of time may be a timestamp, and the specific computing system may be eligible for participation if the present time of the processing server is earlier than the timestamp included in the specific participant profile.

In one embodiment, the method 500 may further include: receiving, by the receiving device of the processing server, a dispute data value associated with the new data value from a third party computing system; generating, by the generation module of the processing server, a private blockchain comprised of a first block including a block header and the new data value; generating, by the generation module of the processing server, a new cryptographic key pair comprised of a new public key and a new private key; and electronically transmitting, by the transmitting device of the processing server, at least the new private key to the third party computing system. In a further embodiment, the method 500 may also include: generating, by the generation module of the processing server, a second new cryptographic key pair comprised of a second new public key and a second new private key; and electronically transmitting, by the transmitting device of the processing server, at least the second new private key to the computing system. In an even further embodiment, the electronic transmission to the computing system may further include the private blockchain.

Computer System Architecture

Figure 6:
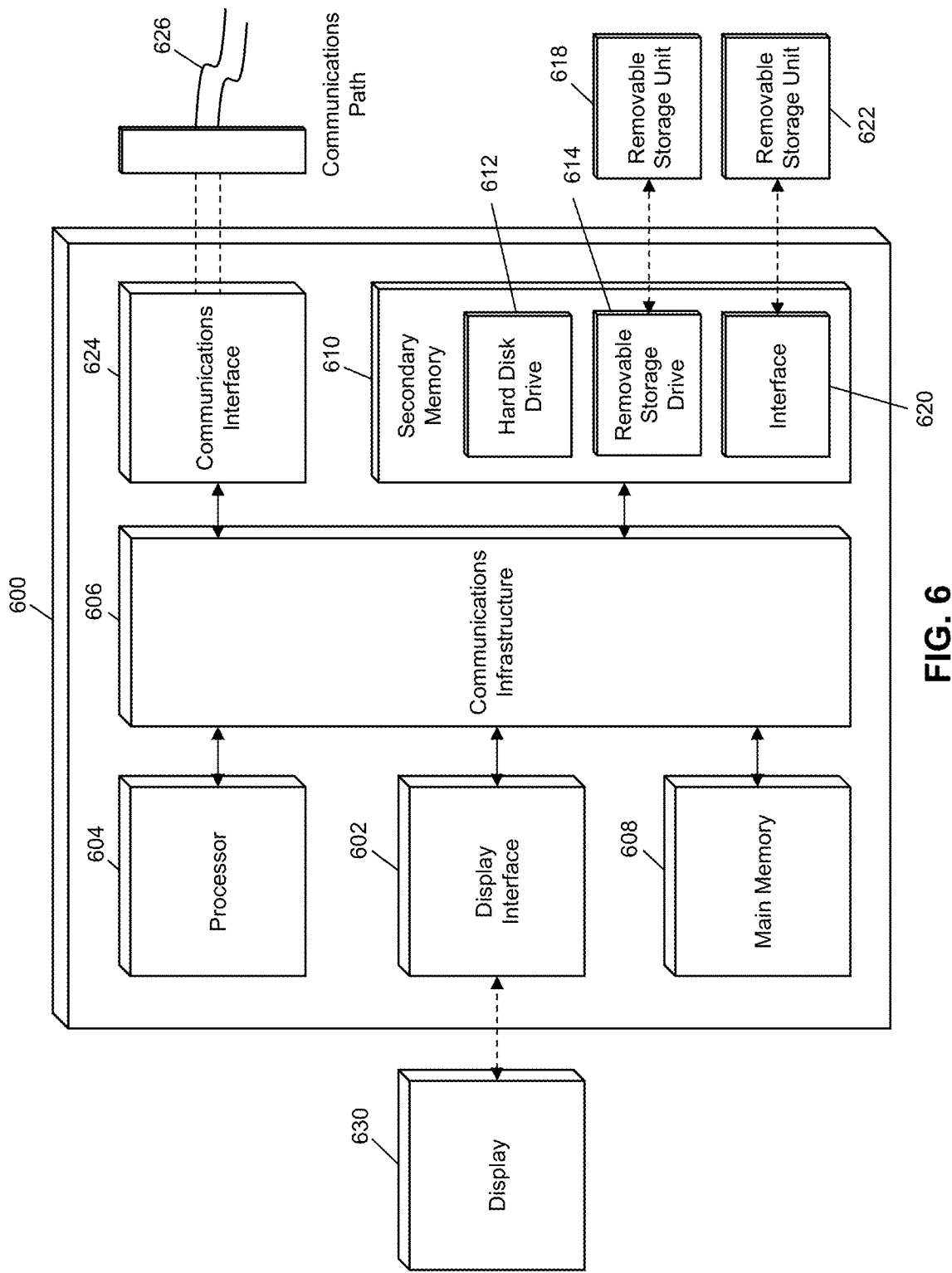
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for controlling participation in a blockchain based on time. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for controlling participation in a blockchain based on time using a processing server comprising a participant database, a verification module, a generation module, a receiving device, a transmission device, a hashing module and a memory, comprising:

storing, by the processing server in the participant database, a plurality of participant profiles, wherein each participant profile is a structured data set related to a computing system and includes at least a public key of a cryptographic key pair associated with the computing system and a period of time;

storing, by the processing server in the memory, a blockchain comprised of a plurality of blocks, wherein each block includes at least a block header and one or more data values;

receiving, by the processing server via the receiving device, a block submission from a first computing system, wherein the block submission includes at least a digital signature and a new data value;

determining, by the processing server, a present time of the processing server;

generating, by the processing server after the receiving the block submission, a timestamp associated with the received block submission based on the determined present time of the processing server;

verifying, by the processing server via the verification module, the digital signature based on at least a first public key stored in a first participant profile of the plurality of participant profiles, wherein the first public key is associated with the first computing system;

based on the verification of the digital signature, determining, by the processing server via the verification module, that the first computing system is eligible to submit the block submission to the blockchain based on the timestamp of the received block submission being within the period of time included in the first participant profile;

in response to the determining the first computing system is eligible to submit data the block submission to the blockchain, generating, by the processing server via the generation module, a first new block comprised of a first block header and at least one data value, wherein the at least one data value includes the new data value;

electronically transmitting, by the processing server via the transmitting device, the generated first new block to one or more nodes associated with the blockchain;

receiving, by the processing server via the receiving device, a dispute data value associated with the new data value from a third party computing system;

generating, by the processing server via the generation module, a private blockchain comprised of a first private block including a first private block header and the new data value;

generating, by the processing server via the generation module, a new cryptographic key pair comprised of a new public key and a new private key; and electronically transmitting, by the processing server via the transmitting device, at least the new private key to the third party computing system.

2. The method of claim 1, wherein generating the first new block includes:

generating, by the processing server via the hashing module, a data reference value via an application of one or more hashing algorithms to the at least one data value; and generating, by the processing server via the hashing module, a block reference value via the application of one or more hashing algorithms to a most recent block of the plurality of blocks, wherein
the first block header included in the first new block includes at least the generated data reference value and the generated block reference value.

3. The method of claim 1, wherein
the block header included in each block of the plurality of blocks includes a timestamp, and
the first block header included in the first new block includes the present time of the processing server.

4. The method of claim 1, wherein the present time is included within the period of time included in the first participant profile.

5. The method of claim 1, wherein
the first computing system is eligible for participation if the present time of the processing server is earlier than the period of time included in the first participant profile.

6. The method of claim 1, further comprising:
generating, by the processing server via the generation module, a second new cryptographic key pair comprised of a second new public key and a second new private key; and
electronically transmitting, by the processing server via the transmitting device, at least the second new private key to the first computing system.

7. The method of claim 6, wherein the electronic transmission to the first computing system further includes generating, by the processing server via the generation module, a subsequent private block to be added to the private blockchain.

8. The method of claim 1, wherein submissions to the private blockchain are directed to a resolution of the dispute data value, and
wherein the processing server, the first computing system, and the third party computing system are authorized entities of the private blockchain.

9. The method of claim 8, further comprising:
receiving, by the processing server via the receiving device, a dispute resolution data value associated with the new data value from at least one of the authorized entities, the dispute resolution data value indicating a resolution result of the private blockchain;
generating, by the processing server via the generation module, a second new block comprised of a second block header and at least the dispute resolution data value; and
electronically transmitting, by the processing server via the transmitting device, the generated second new block to the one or more nodes associated with the blockchain.

10. The method of claim 9, further comprising:
in response to the receiving the dispute resolution data value, deleting, by the processing server, the private blockchain.

11. A system for controlling participation in a blockchain based on time, the system comprising:
a processing server, the processing server comprising:
a processor;
a memory storing a participant database, a verification module, a generation module, a receiving device, a transmission device, a hashing module, and computer readable instructions that, when executed by the processor, cause the processor to perform the steps of:
storing, in the participation database, a plurality of participant profiles, wherein each participant profile is a structured data set related to a computing system and includes at least a public key of a cryptographic key pair associated with the related computing system and a period of time;
storing, in the memory, a blockchain comprised of a plurality of blocks, wherein each block includes at least a block header and one or more data values;
receiving, via the receiving device, a block submission from a first computing system, wherein the block submission includes at least a digital signature and a new data value;
determining a present time of the processing server;
generating, after the receiving the block submission, a timestamp associated with the received block submission based on the determined present time of the processing server;
verifying, via the verification module, the digital signature based on at least a first public key stored in a first participant profile of the plurality of participant profiles, wherein the first public key is associated with the first computing system;
based on the verification of the digital signature, determining, via the verification module, that the first computing system is eligible to submit the block submission to the blockchain based on the timestamp of the received block submission being within the period of time included in the first participant profile;
in response to the determining the first computing system is eligible to submit data the block submission to the blockchain, generating, via the generation module, a first new block comprised of a first block header and at least one data value, wherein the at least one data value includes the new data value;
electronically transmitting, via the transmitting device, the generated first new block to one or more nodes associated with the blockchain;
receiving, via the receiving device, a dispute data value associated with the new data value from a third party computing system;
generating, via the generation module, a private blockchain comprised of a first private block including a first private block header and the new data value; and
generating, via the generation module, a new cryptographic key pair comprised of a new public key and a new private key; and
electronically transmitting, via the transmitting device, at least the new private key to the third party computing system.

12. The system of claim 11, wherein generating the first new block includes:
generating, via the hashing module, a data reference value via an application of one or more hashing algorithms to the at least one data value; and
generating, via the hashing module, a block reference value via the application of one or more hashing algorithms to a most recent block of the plurality of blocks,
wherein
the first block header included in the first new block includes at least the generated data reference value and the generated block reference value.

13. The system of claim 11, wherein
the block header included in each block of the plurality of blocks includes a timestamp, and
the first block header included in the first new block includes the present time of the processing server.

14. The system of claim 11, wherein the present time is included within the period of time included in the first participant profile.

15. The system of claim 11, wherein
the first computing system is eligible for participation if the present time of the processing server is earlier than the period of time included in the first participant profile.

16. The system of claim 11, wherein the generating the new cryptographical key pair further comprises generating a second new cryptographic key pair comprised of a second new public key and a second new private key, and
wherein the electronically transmitting at least the new private key to the third party computing system further comprises electronically transmitting at least the second new private key to the first computing system.

17. The system of claim 16, wherein the electronic transmission to the first computing system further includes generating, via the generation module, a subsequent private block to be added to the private blockchain.

18. The system of claim 11, wherein submissions to the private blockchain are directed to a resolution of the dispute data value, and
wherein the processing server, the specific computing system, and the third party computing system are authorized entities of the private blockchain.

19. The system of claim 18, wherein the memory storing the instructions that, when executed by the processor, further cause the processor to perform additional steps comprising:
receiving, via the receiving device, a dispute resolution data value associated with the new data value from at least one of the authorized entities, the dispute resolution data value indicating a resolution result of the private blockchain;
generating, via the generation module, a second new block comprised of a second block header and at least the dispute resolution data value; and
electronically transmitting, via the transmitting device, the generated second new block to the one or more nodes associated with the blockchain.

20. The system of claim 19, wherein the memory storing the instructions that, when executed by the processor, further cause the processor to perform additional steps comprising:
in response to the receiving the dispute resolution data value, deleting the private blockchain.

* * * * *